(12) United States Patent
Iwata

(10) Patent No.: US 6,385,582 B1
(45) Date of Patent: May 7, 2002

(54) MAN-MACHINE SYSTEM EQUIPPED WITH SPEECH RECOGNITION DEVICE

(75) Inventor: Takahiro Iwata, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/562,755

(22) Filed: May 2, 2000

(30) Foreign Application Priority Data

May 3, 1999 (JP) .............................................. 11-161474

(51) Int. Cl.[7] .......................... G10L 21/00; G10L 15/22
(52) U.S. Cl. .................... 704/270; 704/270.1; 704/275; 704/231; 704/251
(58) Field of Search ................................ 704/231–258, 704/270, 270.1, 275

(56) References Cited

U.S. PATENT DOCUMENTS

| | | | | |
|---|---|---|---|---|
| 5,027,406 A | * | 6/1991 | Roberts et al. | 704/251 |
| 5,526,407 A | * | 6/1996 | Russell et al. | 704/251 |
| 5,794,189 A | * | 8/1998 | Gould | 704/231 |
| 5,956,684 A | * | 9/1999 | Ishii et al. | 704/270 |

FOREIGN PATENT DOCUMENTS

JP  2000-315096  * 11/2000 ........... G10L/15/22

OTHER PUBLICATIONS

VoiceAssist™ (Creative Labs, Inc.© Jul. 1993).*
Dragon Dictate™ (User'Guide, Dragon Systems Inc. © 1996).*
Just Voice™ (Voice Recognition for Microsoft® Windows™ 3.1 © 1994).*

* cited by examiner

Primary Examiner—Richemond Dorvil
Assistant Examiner—Daniel A. Nolan
(74) Attorney, Agent, or Firm—Arent Fox Kintner Plotkin & Kahn, PLLC

(57) ABSTRACT

A man-machine system equipped with a voice recognition apparatus for input words is provided. The system controls each of functions, handling each control word composed of a control command word and an object word. If only the control command word is inputted into the system as one of the input words, the system complements the corresponding object word by using an object word of the other input words recognized previously. The system further designates similar candidates and stores them in a memory. If correction is requested, the current candidate is corrected with another one of the candidates stored in the memory. The system further stores the input words in the memory, so that re-recognition according to the input words previously inputted and stored in the memory is also executed when one of the candidates is corrected.

23 Claims, 12 Drawing Sheets

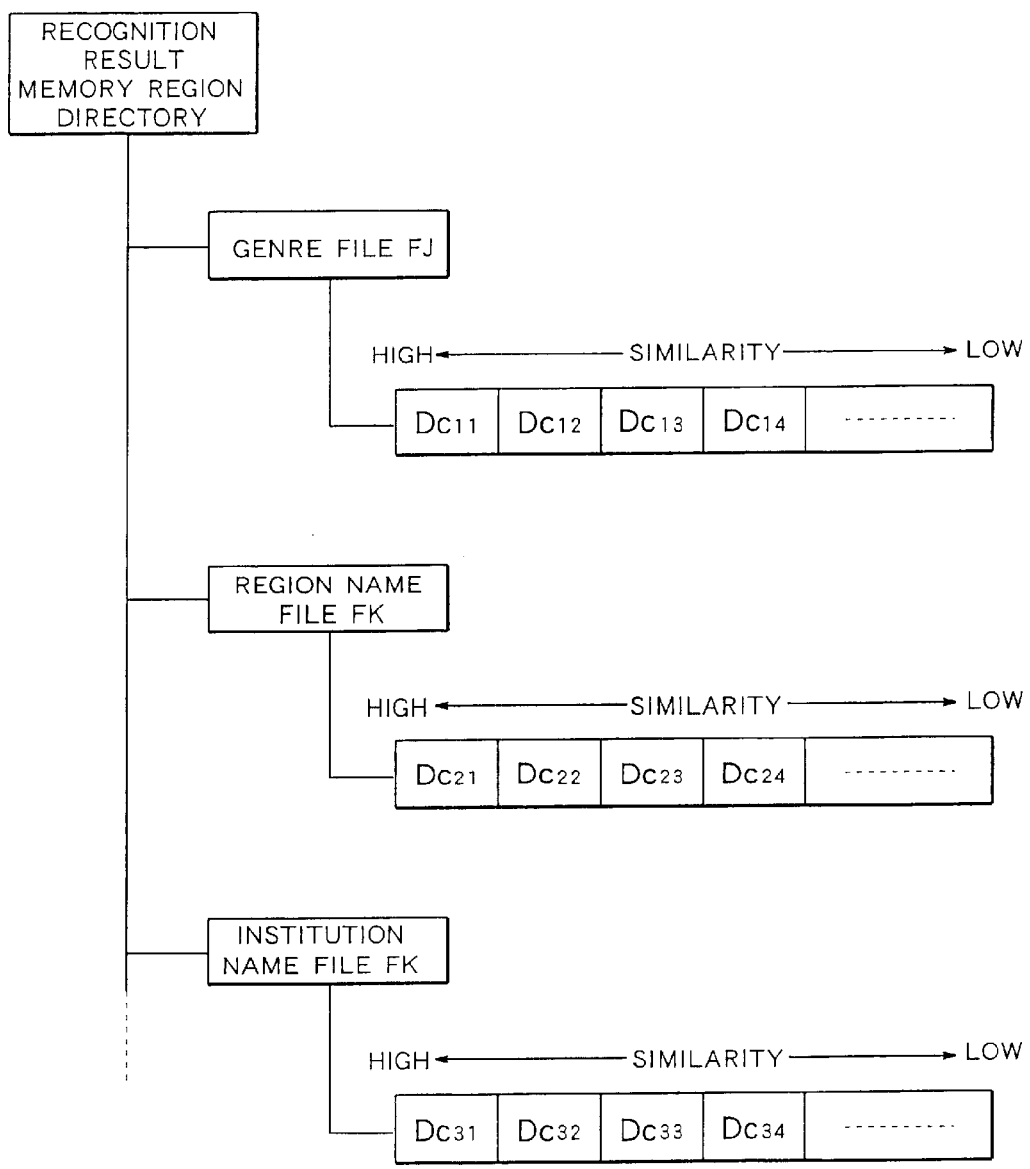

FIG. 4 A

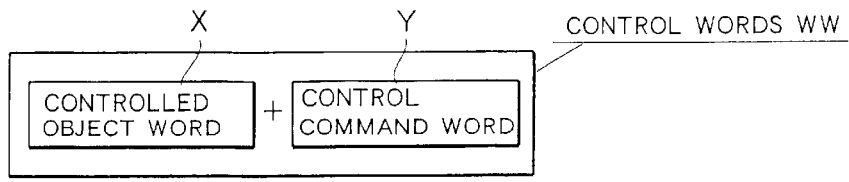

(THE FIGURE SHOWS A BASIC UNIT OF CONTROL WORDS.)

FIG. 4 B

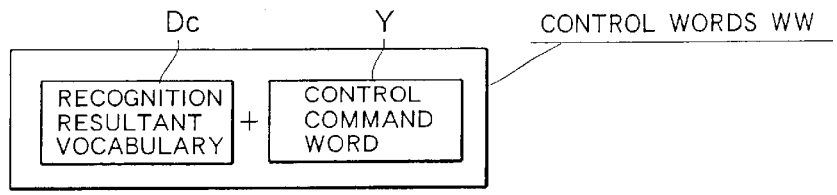

(THE FIGURE SHOWS THE CASE WHERE AN OBJECT WORD TO BE CONTROLLED IS A RECOGNITION RESULTANT VOCABULARY.)

FIG. 4 C

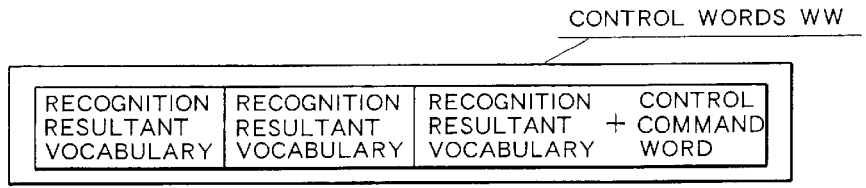

(THE FIGURE SHOWS ONE EXAMPLE OF THE CASE WHERE AN OBJECT WORD TO BE CONTROLLED IS A RECOGNITION RESULTANT VOCABULARY.)

FIG. 4 D

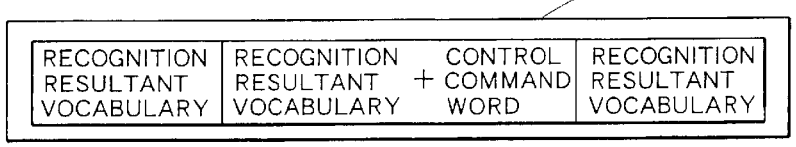

(THE FIGURE SHOWS ONE EXAMPLE OF THE CASE WHERE AN OBJECT WORD TO BE CONTROLLED IS A RECOGNITION RESULTANT VOCABULARY.)

FIG. 4 E

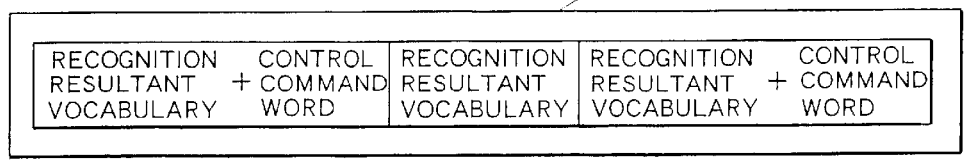

(THE FIGURE SHOWS ONE EXAMPLE OF THE CASE WHERE AN OBJECT WORD TO BE CONTROLLED IS A RECOGNITION RESULTANT VOCABULARY.)

FIG. 5

| CONTROL WORDS | INDICATORS | MEANINGS OF CONTROL COMMAND |
|---|---|---|
| ~,DETAILED INFORMATION | CD | PRESENT DETAILED INFORMATION OF "~". |
| ~,ROUTE DISPLAY | RD | SERCH AND DISPLAY A DRIVING PATH TO "~". |
| ~,ENLARGED DISPLAY | LD | MAGNIFY AND DISPLAY "~" ON A MAP. |
| ~,REDUCED DISPLAY | SD | REDUCE AND DISPLAY "~" ON A MAP. |
| ~,CHANGE | CG | CHANGE THE RECOGNITION RESULTANT VOCABULARY OF "~". |
| ~,DELETION | DW | DELETE THE RECOGNITION RESULTANT VOCABULARY OF "~". |
| ~,ADDITION | AW | ADD THE VOCABULARY OF "~". |
| ~,CORRECTION | CW | CORRECT THE RECOGNITION RESULTANT VOCABULARY OF "~". |
| CORRECTION | CW | CORRECT THE RECOGNITION RESULTANT VOCABULARY THAT HAS BEEN RECOGNIZED AT THE LAST. |
| ~,NEXT CANDIDATE | NW | CHANGE THE RECOGNITION RESULTANT VOCABULARY OF "~" TO THE NEXT CANDIDATE. |
| NEXT CANDIDATE | NW | CHANGE THE RECOGNITION RESULTANT VOCABULARY THAT HAS BEEN RECOGNIZED AT THE LAST TO THE NEXT CANDIDATE. |
| | | |

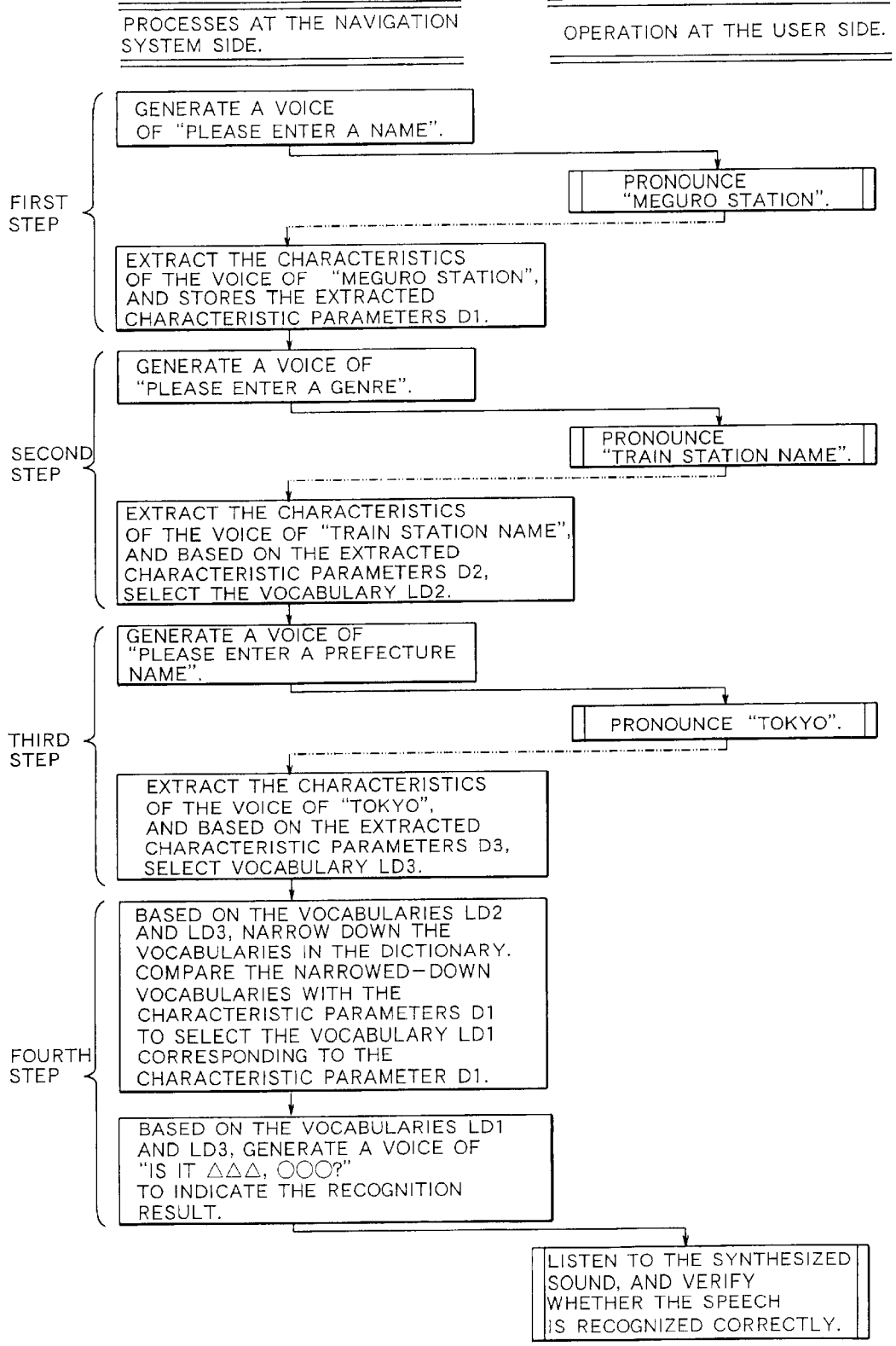

MAN-MACHINE SYSTEM EQUIPPED WITH SPEECH RECOGNITION DEVICE

BACKGROUND OF THE INVENTION

The present invention relates to a man-machine system having speech recognition functions, and more specifically, to a man-machine system in which a user can input desired instructions in a simple manner at the user side, and in which desired processes can be performed properly in accordance with the user instructions at the man-machine system side.

Although the concept of man-machine systems initially concerned a system (device) constructed for enhancing the respective advantages of human and computers, nowadays it is said that this concept also embraces systems which facilitate relationships between human and more general machines (machines in a broader sense) as well as computers.

Man-machine systems, such as systems equipped with a speech recognition device in which a speaker (user) can instruct (command) its intention through voice input, are known. For example, a navigation system using a GPS (Global Positioning System) cruising scheme for automobiles is known. In this navigation system, users can designate a destination, etc., through voice input.

When a user pronounces a desired destination, this navigation system speech-recognizes the destination; searches a driving path from the present location to the destination; and displays the searched driving path on a map through a display device.

For example, the navigation system recognizes the destination designated by the user by performing predetermined steps shown in FIG. 13. Suppose that the user wishes to know a driving path to "Meguro station", which is the destination. First, a voice synthesizer in the speech recognition device generates a synthesized sound of "Please enter the name" in order to request the user to voice-input (pronounce) a specific destination name. If the user pronounces "Meguro station" in response, the speech recognition device extracts the characteristics of the voice of "Meguro station", and temporarily stores the extracted characteristic parameters D1 in a memory part or the like. That is, at the first step, the speech recognition device only extracts the characteristics of the voice of "Meguro station" without performing final-stage recognition.

Next, at the second step, the voice synthesizer generates a synthesized sound of "Please enter a genre" in order to request the user to pronounce a genre, which is a higher level concept than the specific destination the user desires.

If the user pronounces "train station name" in response, the speech recognition device extracts the characteristics of this voice of "train station name" to generate the corresponding characteristic parameters D2. Further, the speech recognition device compares the characteristic parameter D2 with recognition reference vocabularies in a recognition word dictionary which has been pre-installed in the speech recognition device, and selects a recognition reference vocabulary LD2 which is most similar to the characteristic parameter D2, thereby conducting speech recognition of the voice of "train station name" pronounced by the user.

Next, at the step 3, the voice synthesizer generates a synthesized sound of "Please enter a prefecture name" to request the user to pronounce a region name.

If the user pronounces "Tokyo" in response, the speech recognition device extracts the characteristics of this voice of "Tokyo" to generate the corresponding characteristic parameters D3. Further, the speech recognition device compares the characteristic parameter D3 with recognition reference vocabularies in the recognition word dictionary, and selects a recognition reference vocabulary LD3 which is most similar to the characteristic parameter D3, thereby conducting speech recognition of the voice of "Tokyo" pronounced by the user.

Next, at the step 4, among recognition reference vocabularies in the recognition word dictionary, the speech recognition device narrows down recognition reference vocabularies to the ones belonging to the categories of the recognition reference vocabularies LD2 and LD3. Further, the speech recognition device compares the characteristic parameter D1 With the narrowed-down recognition reference vocabularies to select a recognition reference vocabulary LD1 which is most similar to the characteristic parameters D1, thereby conducting speech recognition of the voice of "Meguro station" pronounced at the first step.

That is, at the first step where the lower level concept of the name "Meguro station" is pronounced, it is in general difficult to identify the recognition reference vocabulary LD1 corresponding to "Meguro station", which exists within the region the user desires.

Because of this difficulty, the characteristic parameters D1 of the pronounced voice of "Meguro station" are first stored in the memory part. Then, at the second through fourth steps, a searching range for recognition reference vocabularies in the recognition word dictionary is narrowed down by receiving voices of the genre and region name from the user. Then, by comparing the characteristic parameters D1 with the thus narrowed-down recognition reference vocabularies, the recognition reference vocabulary LD1 corresponding to "Meguro station" is relatively easily identified.

Finally, based upon the selected recognition reference vocabularies LD3 and LD1, a synthesized sound of "It is ◯◯◯ in △△△, isn't it?" is generated to provide the user with the recognition result. That is, when the recognition reference vocabularies LD3 and LD1 are properly recognized as "Tokyo" and "Meguro station", respectively, the synthesized sound of "It is ◯◯◯ in △△△, isn't it?" becomes a synthesized sound of "It is Meguro station in Tokyo, isn't it?", and is presented to the user as such.

Thus, the speech recognition device merely selects the recognition reference vocabularies LD1 to LD3 from the recognition word dictionary as the vocabularies most similar to the respective words pronounced by the user. Accordingly, there is an inevitable possibility that "Meguro station" is wrongly recognized as "Mejiro station", or "Tokyo" is wrongly recognized as "Kyoto", etc., in the case where the user's pronounced voice was not clear or in some other circumstances. If such misrecognition occurs, a synthesized sound of "It is Mejiro station in Kyoto, isn't it?" would be presented to the user. Thus, the synthesized sound is generated based on recognition reference vocabularies LD3 and LD1 in order to ask for the user confirmation of the recognition results, as described above.

If the user determines that correct speech recognition is performed by hearing this synthesized voice thus presented, the user pronounces "search start", for example. Then, the speech recognition device recognizes this, and the navigation system receives a confirmation instruction and searches a driving path from the current location to the Meguro station in Tokyo. The navigation system then displays the searched driving path on a map through a display device.

On the other hand, if the user determines that the recognition is wrong, the user indicates so by pronouncing "return". Receiving that instruction, the speech recognition device restarts speech recognition, and repeats the speech recognition until it receives the instruction of "search start" from the user with respect to re-presented recognition result.

As explained above, the navigation system possesses a superior functionality in that it enables conversational operations by the combination of a speech recognition device and a voice synthesizer.

Also, because the user is lead to pronounce words, which become keywords, in the order which matches the user's thought characteristics, the system provides the user with improved convenience. In other words, in designating the desired destination, the user designates the most specific destination (Meguro station in the example above), and then designates its genre and region name where that destination exits. Thus, the man-machine system matches the user's thought characteristics.

More specifically, this information search system employs an efficient information management scheme in which a category of the highest level concept, is determined, and then information of an intermediate level concept and a lower level concept which relate to the higher level concept of the category, is managed in a hierarchical manner. By adopting such a hierarchical structure, when a user searches specified information from a large amount of lower level concept information, the target information is narrowed-down by utilizing the higher level concept and the intermediate level concept, thereby enabling rapid access to the desired specified information.

However, when a man-machine system is constructed using search procedures similar to, but different from such an information search system, there are situations where the user's thought characteristics are not properly respected. An example of such cases is as follows. Referring to the navigation system, suppose that the higher level concept category, "genre", is first asked to the user, and the user pronounces "train station name" in response; then the intermediate level concept, "prefecture name", is asked to the user, and the user pronounces "Tokyo" in response; and finally the lower level concept, "specific train station name" is requested to the user, and the user pronounces "Meguro station" in response. In this case, the inquiries are made in the order different from the user's thought characteristics, and as a result, the user is given awkward feeling.

From this point of view, the conventional navigation system causes the user to input user desired items in the order which is not awkward, and accordingly provides improved convenience to users.

However, even in the conventional navigation system, there are cases where the following drawbacks occur due to the employment of the speech recognition scheme which matches the user's thought characteristics.

For example, in the case of FIG. 13, the pronounced sound of "Meguro station" is not speech-recognized at the first step. The sound of "Meguro station" is speech-recognized and the recognition result is presented only after the narrowing-down is performed at the second through fourth steps.

When a recognition error occurs, the instruction of "return" is received, and the speech recognition is repeated to correct the error.

However, the instruction, "return", means a command: "return to the one-step previous process and reinitiate the process". Because of this, if the destination "Meguro station" is wrongly recognized, the user must pronounce "return" three times to return to the first step from the fourth step in order to repeat the processes of the first through fourth steps shown in FIG. 13. This is a significant drawback because the user is forced to conduct cumbersome operations. Similarly, if "train station name" is wrongly recognized, the user must pronounce "return" twice to return to the second step from the fourth step in order to repeat the processes of the second through fourth steps shown in FIG. 13, thereby forcing the user to conduct cumbersome operations, which is undesirable.

Thus, the conventional navigation system responds to recognition errors by providing the function of rewriting (replacing) the previously voice-inputted information with newly voice-inputted information when "return" is pronounced. However, this function simply amounts to repeating of the speech recognition, and does not provide for functions by which the user can instruct correction through simple operations.

Accordingly, it has the drawback of forcing users to perform cumbersome operations.

SUMMARY OF THE INVENTION

The present invention is provided to obviate the problems of the conventional art. An object of the present invention is to provide a man-machine system equipped with a speech recognition device, which enables users to conduct easy conventional operations (correction, etc., for example).

To achieve the object, the present invention provides, a man-machine system equipped with a speech recognition device. The speech recognition device has one or more of processing functions and performing the one processing function in a conversational manner using voice as information communication medium. The speech recognition device comprises a control part, wherein the control part pre-stores control words which correspond to respective the processing functions, and wherein the control part presents the one processing function. When voice input information having instruction information which designates the one processing function is inputted from outside in response to the presentation, the control part recognizes the voice input information, and performs the one processing function in accordance with the control words which correspond to the instruction information.

Also, as a further construction, the control words may be a combination of a control command word instructing operation of the processing function and a controlled object word indicating an object to be processed by the control command word. Then, when the voice input information having the instruction information which indicates the controlled object word and the control command word is inputted from outside, the control part performs the processing function in accordance with the control words, which comprise the controlled object word and the control command word and which correspond to the instruction information.

Also, the control words may be a combination of a control command word instructing operation of the processing function and a controlled object word indicating an object to be processed by the control command word. The controlled object word may be determined by the instruction information included in the voice input information. Then, when the voice input information having instruction information of the control command word is inputted after the voice input information having instruction information of the controlled object word is inputted, the control part performs the processing function in accordance with the control words which comprises the controlled object word and the control command word.

According to these constructions, the control part receives instruction information included in the voice input information as corresponding to control words, and performs the processing function instructed by the instruction information based upon the control words. Thus, by registering various kinds of control command words which control respective processing functions in these control words, a variety of processes corresponding to instruction information can be performed.

In another aspect, the present invention provides a man-machine system equipped with a speech recognition device. The speech recognition device has one or more of processing functions and performs the one processing function in a conversational manner with voice as information communication medium. The speech recognition device includes a memory part pre-storing a plurality of reference information; and a control part having a recognition result storage region for storing one or more of reference information which have a similarity higher than a predetermined similarity standard as recognition information by comparing voice input information inputted by the voice with the reference information stored in the memory part. The control part further possesses control words which correspond to respective the processing functions. Here, the control part presents-the one processing function, and when voice input information having instruction information which designates the one processing function is inputted from outside in response to the presentation, the control part performs the one processing function with respect to the recognition information stored in the recognition result storage region in accordance with the control words which correspond to the instruction information.

With this construction, similarly to above, by registering various kinds of control command words which control respective processing functions in the control words, a variety of processes corresponding to instruction information can be performed.

Further, the recognition information may be one or more of vocabulary information obtained by comparing the voice input information formed by vocabularies pronounced by a speaker with the reference information, and the control words may be instruction information for correcting the vocabulary information.

The instruction information for correcting the vocabulary information may be control information which designates and corrects one of the one or more vocabulary information.

The instruction information for correcting the vocabulary information may be control information which corrects the one or more vocabulary information by selecting the next candidate successively.

Furthermore, the control words may be the instruction information of a combination of a control command word instructing an operation of correction corresponding to the processing function and a controlled object word corresponding to the vocabulary information which is an object to be processed by the control command word. In this case, when the voice input information having the instruction information is inputted from outside, the control part may perform the correction in accordance with the control words, which comprise the controlled object word and the control command word and which correspond to the instruction information.

Moreover, the memory part may store the plurality of reference information in a hierarchical structure which has plural classifications in terms of attribute categories ranging from an upper level concept to a lower level concept. The memory part may further have an information storage part for storing the voice input information formed of vocabularies pronounced by the speaker. The control part presents the processing function corresponding to two or more of the attributes, and in response thereto, stores the vocabularies corresponding to the two or more of the attributes in the recognition result storage region as the recognition information for respective the attributes. When an instruction to correct the recognition information having an attribute of the higher level concept is given by the instruction information thereafter, the control part performs correction of the recognition information having the attribute of the higher level concept, and compares the voice input information, which is stored in the information storage part and has an attribute which is a lower level concept than the higher level concept, with the reference information, which is stored in the memory part and which has an attribute of a lower level concept which depends from the higher level concept. The control part thereby re-stores one or more of reference information which has a similarity higher than a predetermined similarity standard in the recognition result storage region as recognition information.

Here, the control part may be constructed such that when the voice input information is re-compared, the control part refers to reference information, which is reference information having the same attribute as the recognition information of the lower level concept, and which excludes reference information identical to the recognition information of the lower level concept.

Also, the memory part may store the plurality of reference information in a hierarchical structure which has plural classifications in terms of attribute categories ranging from an upper level concept to a lower level concept. The memory part may further have an information storage part for storing the voice input information formed of vocabularies pronounced by the speaker, wherein the control part presents the processing function corresponding to two or more of the attributes, and in response thereto, stores the vocabularies corresponding to the two or more of the attributes in the recognition result storage region as the recognition information for respective the attributes. When an instruction to correct the recognition information having an attribute of the lower level concept by selecting a next candidate successively is given by the instruction information, the control part presents recognition information which is selected as the next candidate as new recognition information.

According to these constructions, the instruction information for correction to be inputted from outside is received as the command words having information regarding various correction processes. Then, the various correction processes are conducted based on the control words. In particular, when recognition information becomes meaningful only when the information is hierarchically organized, correction of recognition information having an attribute of a higher level concept affects recognition information having an attribute of a lower level concept. Conversely, correction of recognition information having an attribute of a lower level concept affects recognition information having an attribute of a higher level concept. Thus, appropriate processing becomes necessary. In that case, by providing control words with functions capable of performing appropriate correction operations, it becomes possible to perform speedy and appropriate correction processing.

For example, when a destination is inputted in a navigation system, and if recognition information as the recognition result is in error, or the destination needs to be changed, prompt correction processing is desirable. In such a case, by using control words, it becomes possible to conduct prompt conversational operations.

BRIEF DESCRIPTION OF THE DRAWINGS

These and other objects and advantages of the present invention will become clear from the following description with reference to the accompanying drawings, wherein:

FIG. 3 is an explanatory figure showing a file structure in a recognition result memory region;

FIGS. 4A to 4E are explanatory figures showing structures of control words;

FIG. 5 is an explanatory figure showing examples of types of control words;

FIG. 13 is a flowchart for explaining the operation of a conventional speech recognition device.

DETAILED DESCRIPTION OF THE PREFERRED EMBODIMENTS

Preferred embodiments of the present invention will now be described in detail below with reference to the drawings. Also, as a preferred embodiment, an automobile navigation system utilizing speech recognition functionality will be described.

Figure 1:
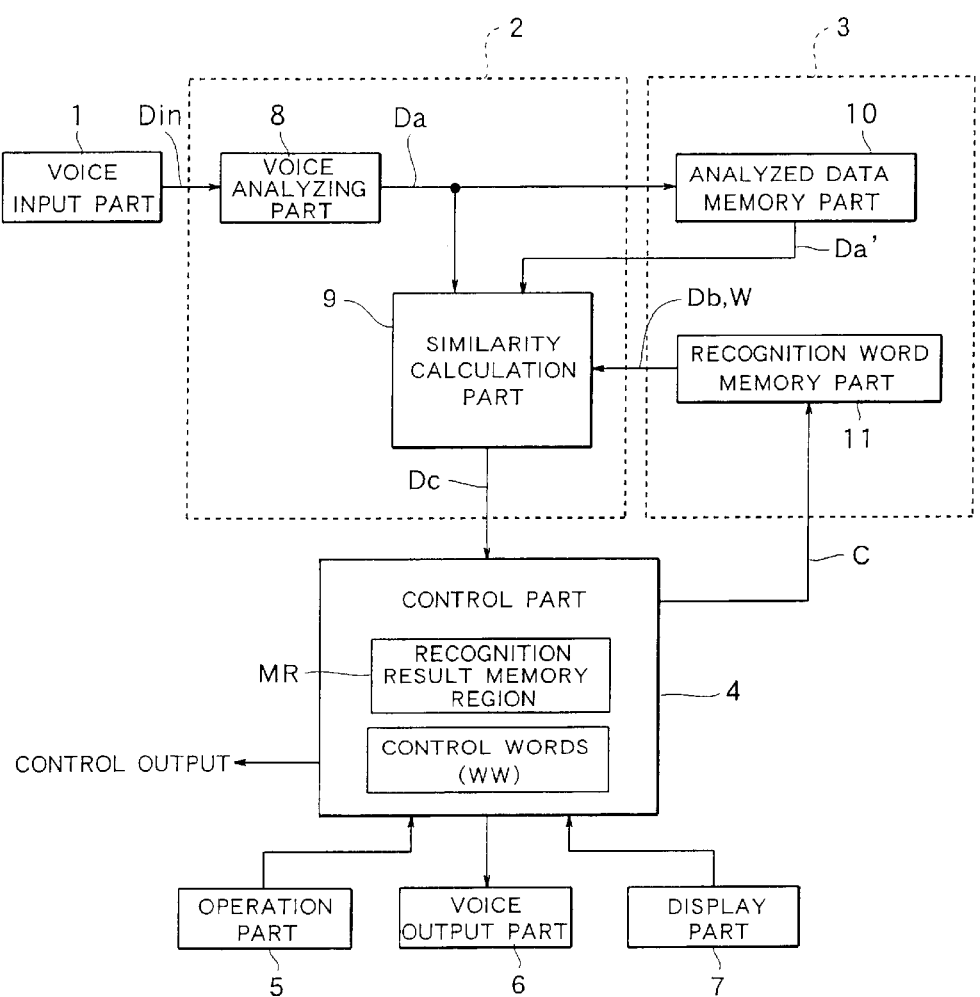
FIG. 1 is a block diagram showing a configuration of a speech recognition device according to the present invention.

FIG. 1 shows a block diagram showing a configuration of a speech recognition device structure which is installed in an automobile navigation system according to a preferred embodiment of the present invention. In more detail, the block diagram shows a part of a speech recognition device which is installed in the automobile navigation system as a man-machine interface device.

As shown in the FIG. 1, this speech recognition device is constructed of a voice input part. 1 equipped with a microphone, a signal processing part 2, memory part 3, control part 4 equipped with a microprocessor (MPU), an operation part 5, such as a keyboard, etc, a voice output part 6 equipped with a voice synthesizer-integrated circuit device, and a display part 7 constructed of a liquid crystal display, etc.

Here, the operation part 5, the voice output part 6, and the display part 7 may share the constituent elements of the navigation system, or may be connected to the system a separate external device(s).

The memory part 3 is constructed of an analyzed data memory part 10 and a recognition word memory part 11. The signal processing part 2 is constructed of a digital signal processor (DSP), etc., and is equipped with a voice analyzing part 8 and a similarity calculation part 9, which operate in accordance with control signals from the control part 4.

The voice-input part 1 collects the voice (speech) made by a user, converts the voices into digital data of voice data Din, and supplies the data to the voice analyzing part 8.

The voice analyzing part 8 extracts the characteristics of the voice pronounced by the user based on the voice data Din, and outputs characteristics parameter data Da which are the result of the extraction (referred to as "analyzed data" hereafter).

The analyzed data memory part 10 is formed of a rewritable memory (RAM), and stores the analyzed data Da which are outputted from voice analyzing part 8. Also, the analyzed data memory part 10 supplies the stored analyzed data. Da' to the similarity calculation part 9 in accordance with control signals from the control part 4.

Here, this speech recognition device adopts a conversational scheme in which it indicates a category of words to be pronounced by the user, and the user speaks one of the words in the category. The analyzed data memory part 10 stores analyzed data Da in correspondence with the indicated category of words.

Figure 2:
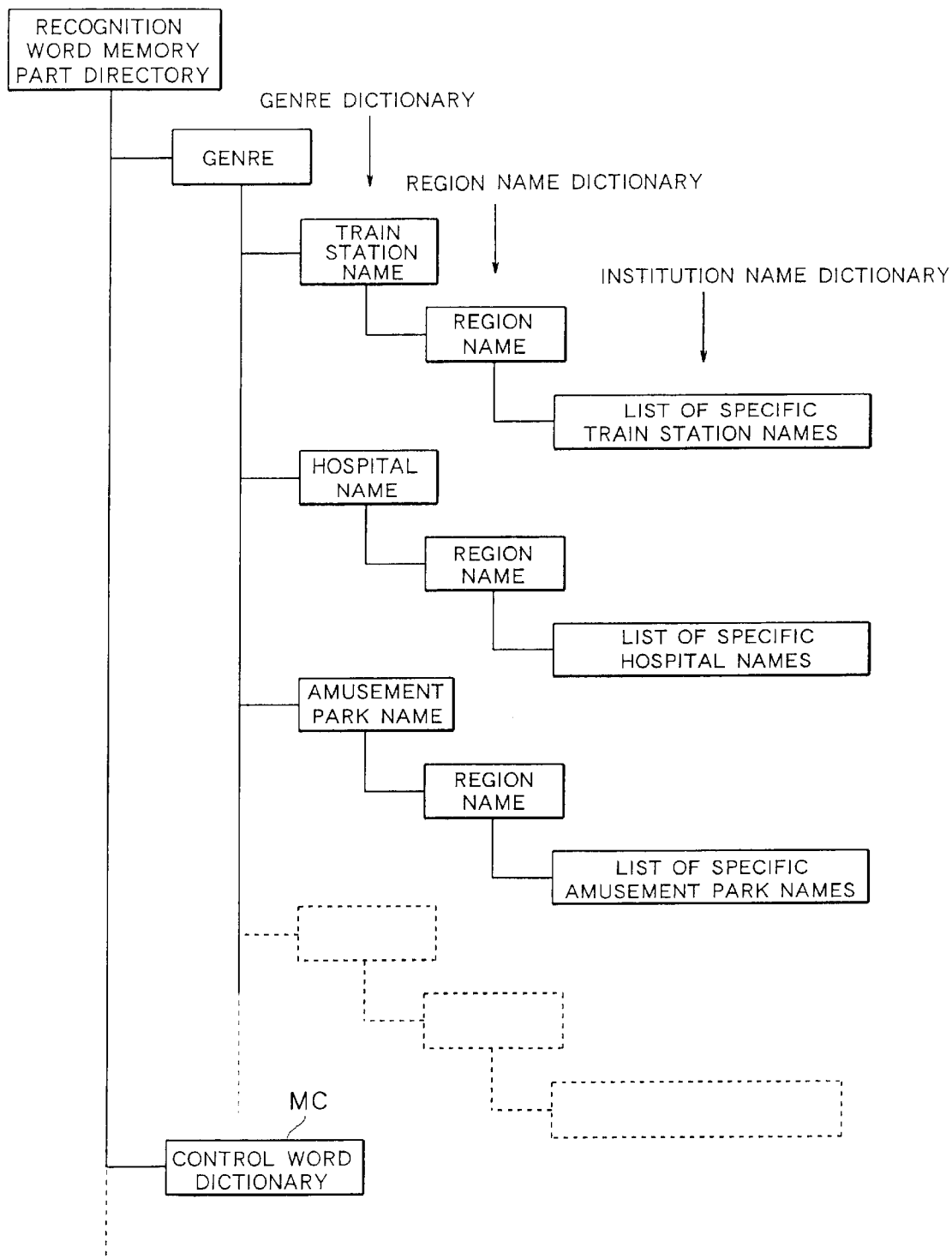
FIG. 2 is an explanatory figure showing a hierarchical structure of recognition dictionaries.

The recognition word memory part 11 is constructed of a read-only memory (ROM), and stores many reference data (referred to as "recognition reference vocabularies" hereafter) which are to be compared with the stored analyzed data Da, Da' when recognizing words pronounced by the user. Those recognition reference vocabularies are stored in a plurality of recognition dictionaries in a classified manner. As shown in FIG. 2, these recognition dictionaries include genre dictionary MJ, region name dictionary MK, and institution name dictionary ML in a hierarchical manner.

At the highest level of the genre dictionary MJ, "train station names", "hospital names", "amusement park names", etc., are assigned as the recognition reference vocabularies. In a region name dictionary MK depending upon each genre dictionary MJ, the region names, such as "Hokkaido", "Tokyo", etc., are assigned as the recognition reference vocabularies. In an institution name dictionary ML depending upon each region name dictionary MK, the specific institution names, such as "Meguro station", "Tokyo station", etc., are assigned as the recognition reference vocabularies.

Thus, under the vocabulary of "train station name" in the genre dictionary MJ, nationally recognized region names, such as "Hokkaido", "Tokyo, " are contained in a tree structure as the recognition reference vocabularies, and under each of the vocabularies of the region names, the institution names of train stations which exist within the corresponding region are contained in a tree structure. Also, under the vocabulary of "hospital name" in the genre dictionary MJ, nationally recognized region names are contained, and under each of the region names, the institution names of many hospitals which are within the region are contained. Similarly, under the vocabulary of "amusement park name," nationally recognized region names and the institution names of many amusement parks in the region are contained.

Furthermore, in this speech recognition device, a plurality of instruction information (referred to as "command vocabularies) is prepared. The instruction information is used for performing the corresponding command, such as correction, which is inputted by the user through voice input or through operation part 5. These command vocabularies W are also stored in the recognition word memory part 11 as command word dictionary MC.

Here, the recognition reference vocabularies (vocabularies which are objects to be recognized), such as "train station name", "hospital name", "amusement park name", etc., which belong to the category of the genre dictionary MJ, are called "genre recognition reference vocabularies." The recognition reference vocabularies". such as "Hokkaido", "Tokyo", etc., which belong to the category of the region name dictionary MK, are called "region name recognition reference vocabularies." The recognition reference vocabularies, which belong to the institution name dictionary ML, is called "institution name recognition reference vocabularies." On the other hand, the operation by which a user provides instructions to this speech recognition device using the command vocabularies W is called "command operation".

The similarity calculation part 9 compares the analyzed data Da supplied from the voice analyzing part 8, with recognition reference vocabularies Db contained in dictionaries MJ, MK, ML, and MC, and selects a recognition reference vocabulary, which is most similar to the analyzed data Da, and vocabularies, whose similarities are higher than a predetermined similarity determination standard. Then, the similarity calculation part 9 outputs the selected recognition reference vocabularies Db to the control part 4 as the recognition resultant vocabularies Dc. Also, the similarity calculation part 9 processes the stored analyzed data Da' supplied from the analyzed data memory part 10 in a similar manner, and outputs recognition resultant vocabularies Dc corresponding to the stored analyzed data Da' to the control part 4.

Through the above procedures, the results of recognition of the speech (voices), such as "train station name", "Tokyo", "Meguro station", etc., and a word pronounced for command operation, such as "correction," are supplied to the control part 4 as the recognition resultant vocabularies Dc.

Here, dictionaries MJ, MK, ML, and MC, which are referred to in comparing with the analyzed data Da, Da', are selectively switched in accordance with control signal C supplied from the control part 4. For example, when a user is requested to pronounce a vocabulary belonging to the category of genre, the genre dictionary MJ is selected by control signal C. After the user pronounces a vocabulary in accordance with the instruction, the similarity calculation part 9 compares the analyzed data Da obtained thereby (or Da') with recognition reference vocabularies in the genre dictionary MJ. This way, the content of the word, which a user is instructed to pronounce, corresponds to a selection of dictionaries MJ, MK, ML, and MC. Further, reading out of the stored analyzed data Da' from the analyzed data memory 10 is conducted in correspondence with selection of dictionaries, MJ, MK, ML, and MC.

The control part 4, by executing a predetermined system program, outputs the control signals for controlling the entire operation of this speech recognition device, and transfers the results of the speech recognition to a central control part (omitted in the figures) in the navigation system as control outputs.

Further, the control part 4 receives instructions from a user through operation part 5, and provides data to be presented to the user and results of speech recognition through a voice output part 6 or display part 7, thereby providing for audio and visual communications.

Also, in the control part 4, a recognition result memory region MR is installed for storing the recognition resultant vocabularies Dc supplied from the similarity calculation part 9. As shown in FIG. 3, the recognition result memory region MR contains genre file FJ, region name file FK, and institution name file FL, and the recognition resultant vocabularies Dc are stored in these files FJ, FK, and FL in a classified manner.

As explained above, this speech recognition device adopts a conversational scheme in which a user is provided with a category of vocabulary, and the user pronounces a vocabulary within the given category of vocabulary. Thus, when the user is asked "Please select a genre," the corresponding recognition resultant vocabularies Dc are stored in the genre file FJ. When the user is asked "Please select a region name," or "Please select a prefecture name," etc., the corresponding recognition resultant vocabularies Dc are stored in the region name file FK. And when the user is asked "Please select the name of the institution," the corresponding recognition resultant vocabularies Dc are stored in the institution name file FL.

Furthermore, a plurality of recognition resultant vocabularies Dc are transferred from the similarity calculation part 9 to the control part 4 in the order of higher similarity. Thus, as shown in FIG. 3, a plurality of recognition resultant vocabularies Dc11, Dc12, etc., Dc21, Dc22, etc., and Dc31, Dc32, etc., are stored in files FJ, FK, and FK, respectively, in the order of higher similarity in an ordered manner.

Then, as a basic operation, the control part 4 analyzes recognition resultant vocabularies Dc11, Dc21, and Dc31, which have the highest similarities in the respective files FJ, FK, and FL, to determine the destination (institution name), etc., designated by the user. However, when a command operation is inputted to select the next candidate, the control part 4 determines the destination (institution name), etc., designated by the user based upon the recognition resultant vocabularies having the next highest similarities.

Furthermore, a plurality of control words WW is filed and stored in the control part 4 in advance. These control words WW are provided for determining the content (meaning) of a command instructed by a command operation in order to conduct speedy operations in response thereto. The control words WW have two basic forms.

As schematically shown in FIG. 4A, a first basic form of the control words WW is constructed of a pair of a controlled object word X and a control command word Y. The control command word Y indicates an operation item to be processed in accordance with the user command, and the controlled object word X indicates an object item to be processed in accordance with the control command word Y. For examples, when this speech recognition device presents the speech recognition result as "It is a train station name in Tokyo, isn't it?, " and a user pronounces "the train station name, correction" in response, a process for correcting the train station name is commenced based upon control words WW which are constructed of (X+Y) =(Train Station Name +Correction). If the result of a new voice input is "hospital name", the corrected result is re-presented in the form of a synthesized voice of "It is a hospital name Tokyo, isn't it?" or the like.

That is, the controlled object word X indicating an object to be controlled has the same content as recognition reference vocabularies, etc., which have one respective attribute (category) of the genre, region names, and institution names, and the control words WW are constructed by attaching a control command word Y to these recognition reference vocabularies or the like in advance.

The above-example is the case where the control command word Y is "correction." Various types of control words WW, as shown in FIG. 5, are prepared in advance. In FIG. 5, the left-most column indicates forms of the control words, the right-most column indicates the meaning of the respective command word, and the middle column indicates the indicators of the respective control command word Y The "~" part is a controlled object word X, and the phrase which follows is a control command word Y.

In a second basic form of control words WW, as shown in FIG. 4B, only the control command words Y are filed and stored in advance, and an instructed control command word Y is afterwards added to the recognition resultant vocabulary Dc, which is designated by a command operation of a user, to construct control words WW. In other words, the control words WW shown in FIG. 4A have the controlled object word X predetermined, whereas the control words WW shown in FIG. 4B have a flexibility in the part of the controlled object words X.

When this speech recognition device presents "It is the train station name in Tokyo, isn't it?" as a result of speech-recognizing "train station name" as a genre and "Tokyo" as a region name in that order, and a user pronounce "correction" in response thereto, the speech recognition device interprets the "correction" as an instruction to correct "Tokyo" as a region name, which were recognized last (immediately prior).

For example, suppose that the last result of the recognition is a recognition resultant vocabulary Dc21 in the region name file FK, and "Tokyo" is presented based upon the recognition resultant vocabulary Dc21. When the correction is instructed, the recognition resultant vocabulary Dc21, which is the latest recognition result, is set as the recognition resultant vocabulary Dc of FIG. 4B. By adding a control command word Y of "correction (CW)" shown in FIG. 5 to this recognition resultant vocabulary Dc21, the control words WW of FIG. 4B is generated. Based upon the control words WW of (Dc21+Y), a process for correcting the region name is commenced. Then, when the result of a new voice input becomes "Kanagawa-prefecture," the result of the correction is presented as a synthesized voice of "It is a station name within the Kanagawa-prefecture, isn't it?" or the like.

Accordingly, the second basic form of the control words WW provides for a speedy response when a user would like to correct the result of voice inputs immediately. For example, when a user would like to change the destination frequently, the final destination to be determined in the end can promptly be instructed by repeating the voice input of the destination, etc., and the command operation of "correction" alternately. That is, pronouncing of "correction," which corresponds to a control command word Y, leads to designation of the last recognition reference vocabulary, thereby enabling simple correction with a superior operability.

On the other hand, with the first basic form of the control words WW, it is possible to conduct proper processing in the case of correcting not only a recognition resultant vocabulary which is speech-recognized at the last, but also a recognition resultant vocabulary which has been speech-recognized before the most recently recognized vocabulary.

FIGS. 4C–4E show concrete examples of other forms of control words WW. These figures show that depending upon the way a user uses command operations, control words WW having various lengths and combinations are possible. According to these developed forms, correction of a plurality of recognition resultant vocabularies at one time (FIGS. 4D and 4E), and instructions to perform actual correction, not immediately after the correction instruction, but after executing some processes, etc., are possible (FIGS. 4C–4E).

In particular, when a user inputs multiple vocabularies and command vocabularies as a continuous speech, it is possible to conduct proper processes, which reflect the intention of the user, based upon these developed forms of control words WW.

Accordingly, this speech recognition device receives user instructions and commands through control words WW, which are combinations of fixed, or flexible controlled object words X and control command words Y, thereby providing a superior conversational operation.

Next, examples of the operation of this speech recognition device having such a construction will be explained with reference to flowcharts shown in FIGS. 6–9. Here, as a representative example, the operation will be explained in the case where a user wishes to correct the vocabulary which has been already voice-inputted; i.e., the case where commands, "~, correction", "correction", "~, next candidate", and "next candidate," shown in FIG. 5 are operated.

Figure 6:
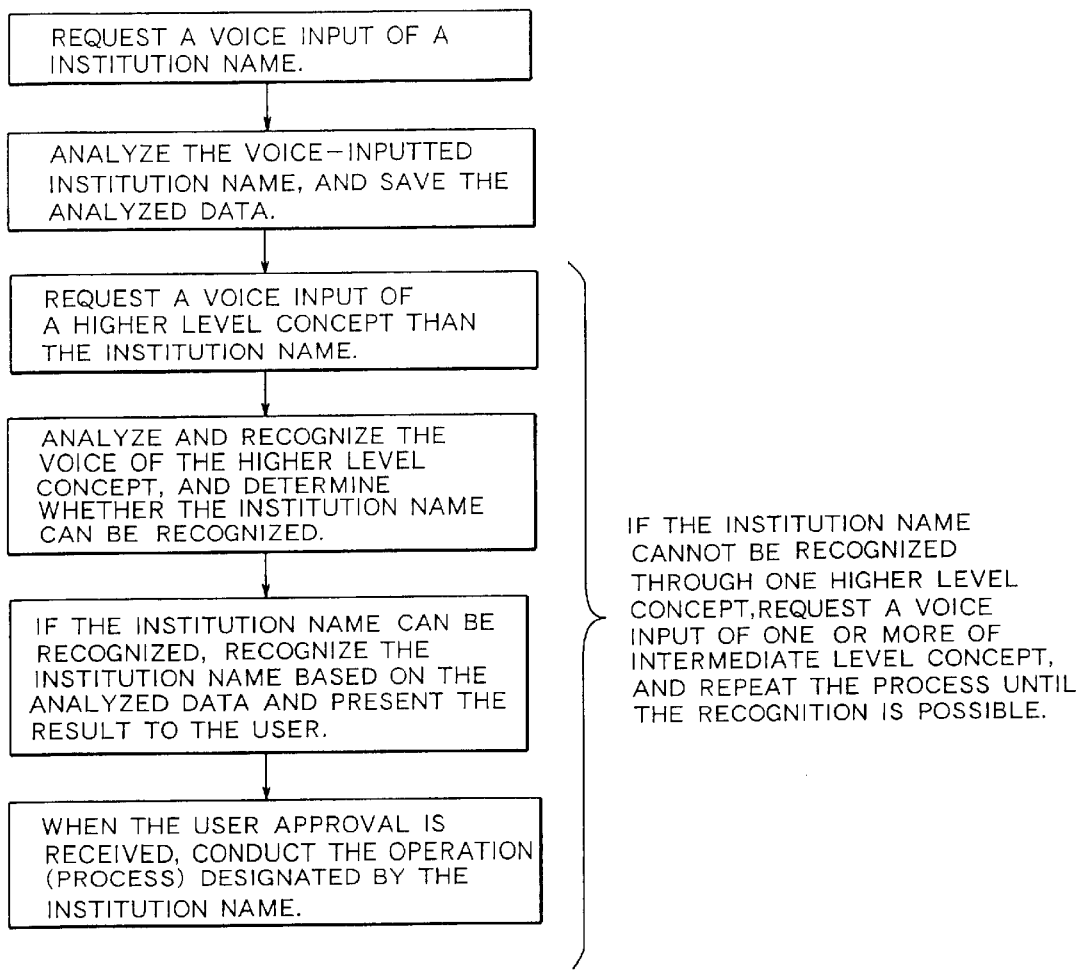
FIG. 6 is a flowchart for explaining an example of basic operation of the present speech recognition device.

FIG. 6 shows a basic operation of a speech recognition process according to the present speech recognition device. In the figure, the speech recognition device requests a user to pronounce a vocabulary of institution name, a vocabulary of genre, and a vocabulary of region name in that order, and narrows down recognition reference vocabularies in the recognition word memory part 11, which are to be referenced, based upon the vocabularies of the genre and the region name. Then, the stored analyzed data Da' which have been stored in the analyzed data memory part 10 are compared with the narrowed-down recognition reference vocabularies Db to identify the vocabulary of the institution name pronounced by the user. This is called "direct speech method," and enables conversational operations which match user's thought characteristics.

Here, if the vocabulary of genre is speech-recognized, and if the vocabulary of institution name can be identified based on the recognition result thereof, it is not necessary for the user to provide the vocabulary of the region name. Accordingly, the request for a vocabulary of region name is omitted in that case.

Referring to FIG. 6, first, this speech recognition device requests a user to voice-input a vocabulary of an institution name. When the user voice-inputs a vocabulary of institution name, which is a desired destination, in response, analyzed data Da are memorized (stored) in the analyzed data memory part 10.

Next, the speech recognition device requests the user to voice-input a vocabulary belonging to the category of genre, which is an upper level concept. When the user voice-inputs a vocabulary belonging to the category of genre (a vocabulary of "train station name," or the like, for example) in response, analyzed data Da of the voice-input are generated, and the analyzed data Da are compared with recognition reference vocabularies Db in the genre dictionary MJ. Then, recognition resultant vocabularies Dc, which are the result of the comparison, are stored in the corresponding file FJ in the recognition result memory part MR. If all conditions for speech-recognizing the analyzed data Da' (analyzed data of the name of the institution pronounced by the user) stored in the analyzed data memory part 10 are met at this point, the stored analyzed data Da' are compared with recognition reference vocabularies Db in the corresponding institution name dictionary ML, and recognition resultant vocabularies Dc, which are the result of the comparison, are stored in the institution name file FL.

Then, a recognition resultant vocabulary Dc of the name of the institution, which is the result of the recognition, is presented to the user for confirmation of whether errors occur in the recognition, etc. When a command operation for searching a driving path to the destination is initiated following the confirmation, a driving path to the destination is searched based upon the corresponding control words WW, and the searched driving path is displayed.

Here, if the institution name as the destination cannot be identified (narrowed down) by inputting a vocabulary of the upper level concept, a request will be made for voice-inputting a region name, which is an intermediate level concept, and a vocabulary belonging to the category of region name (a vocabulary of "Tokyo", for example) is asked to be pronounced. Then, processes similar to those in the case of the genre above are repeated.

Figure 7:
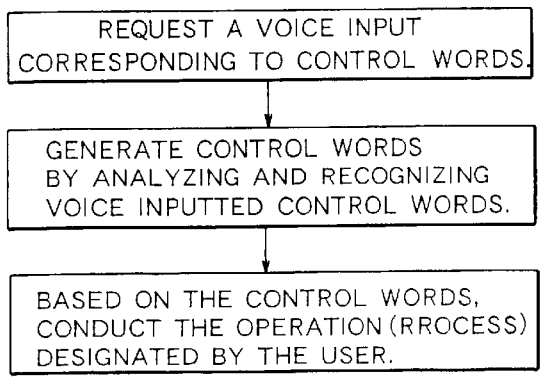
FIG. 7 is a flowchart for explaining an example of basic operation of correction processing of the present speech recognition device.

FIG. 7 shows a basic operation in the case where this speech recognition device speech-recognizes a vocabulary which is voice-inputted, and a command operation, such as correction, is requested by a user in response to presentation of the recognition result.

First, a user is asked whether a command operation, such as correction, is to be performed. If a command operation, such as correction, is requested through voice input or through the operation part 5 in response, the content of the command is recognized. Based upon the corresponding control words WW, a process for correcting the object to be corrected, for example, is performed. The process shown in FIG. 7 may be performed at each of the steps of the speech recognition process shown in FIG. 6, at any times as desired.

Next, more concrete examples of the operation will be explained with reference to FIGS. 8 and 9. When a user performs a command operation for commencing a speech recognition through voice input or through the operation part 5, the process at steps S100 and after are initiated under the control of control part 4.

At step S100, the voice output part 6 outputs a synthesized voice of "Please enter the name" in accordance with instructions from the control part 4 in order to request (inquire) a user to voice-input the name of a desired destination (institution name).

If the user pronounces "Meguro-station" as the institution name in response (step S102), the voice of "Meguro-station" is collected, and the voice analyzing part 8 analyzes the voice to generate analyzed data Da of the voice of "Meguro-station (step S104).

Next, the analyzed data memory part 10 stores the analyzed data Da of the institution name "Meguro-station" (step S106). That is, because a large amount of recognition reference vocabularies corresponds to the institution name, the analyzed data Da of the institution name is stored in the analyzed data memory part 10 until the range of comparison in the recognition dictionary is narrowed down by completing a narrow-down operation. This process will be described later.

Next, at step S108, a genre dictionary MJ is selected (set) in the recognition word memory part 11 to set the system in a condition capable of inputting voices relating to a genre.

Next, at step S110, the similarity calculation part 9 starts recognizing the input voices based upon recognition reference vocabularies Db in the genre dictionary MJ. The voice output part 6 outputs a synthesized sound of "Please enter a genre" to request the user to pronounce a vocabulary which belongs to the category of genre.

When the user pronounces a vocabulary belonging to the category of genre ("train station name", for example) in response, the voice of "train station name" is collected, and the voice analyzing part 8 extracts the characteristics of the voice to generate analyzed data Da of the voice of "train station name." The analyzed data Da is supplied to the similarity calculation part 9 (step S114). Also, the analyzed data Da is stored in the analyzed data memory part 10.

Next, at step S116, the similarity calculation part 9 compares the analyzed data Da of the voice of the "train station name" with recognition reference vocabularies Db in the genre dictionary MJ to select one or more of recognition reference vocabularies, whose similarities are higher than a similarity determination standard. Then, the selected recognition reference vocabularies are sorted in the order of higher similarity, supplied to control part 4 as the recognition resultant vocabularies Dc, and are stored in the genre file FJ shown in FIG. 3.

Next, at step S118, among the recognition resultant vocabularies Dc stored in the genre file FJ, the vocabulary having the highest similarity (corresponding to Dc11 in FIG. 3) is supplied to the voice output part 6 and display part 7 to present the recognition result in terms of a synthesized voice and character display, etc. If the recognition resultant vocabulary Dc11 is "train station name", a synthesized sound of "It is a station name, isn't it?" or the like is presented to the user.

Next, when the user performs a command operation of "train station name, correction" by pronouncing it in response to the presentation, the correction command is recognized at step S120 as "YES" and the flow moves to step S122.

Here, at step S120, because the command operation of "train station name, correction" is performed, a correction scheme is determined based upon the first basic form of control words WW shown in FIG. 4A. In other words, by investigating the control words WW having a recognition resultant vocabulary of "train station name" as the controlled object word X and "correction" as the control command word Y, it is determined that "train station name" should be corrected (substituted) by another recognition reference vocabulary in the same level (i.e., another recognition reference vocabulary belonging to the category of genre).

Then at step S122, control signal C is supplied to the recognition word memory part 11 based upon the control words WW to set the genre dictionary MJ. However, corresponding to the controlled object word X of "train station name", the recognition reference vocabulary of "train station name" in the genre dictionary MJ is excluded and the remaining recognition reference vocabularies are prepared for comparison.

Next, the processes at steps S110–S118 are repeated. Accordingly, at step S110 a synthesized voice of "Please enter a genre" is outputted to request a user input. When the user inputs a voice other than "train station" at step S112, the inputted voice is analyzed and recognized at steps S114 and S116, and newly determined recognition resultant vocabularies Dc are supplied to control part 4.

Then, at step S118, control part 4 corrects (substitutes) old recognition resultant vocabularies Dc11, Dc12, etc., in the genre file FJ with new recognition resultant vocabularies Dc11, Dc12, etc. For example, when the user voice-inputs "hospital name", recognition resultant vocabularies Dc similar to the "hospital name" are stored in the genre file FJ, and the correction process designated by the user is performed (steps S112 to S118).

If a simple "correction" command operation is performed at step S120 instead, a correction scheme is determined based on the second basic form control words WW, as shown in FIG. 4B. In other words, based upon the control words WW, which are formed by adding the control command word Y of "correction" to the highest similarity recognition reference vocabulary Dc11 in the genre file FJ, it is determined that "train station name" should be corrected (substituted) by another recognition reference vocabulary which is in the same level (i.e., another recognition reference vocabulary belonging to the category of genre).

Thus, through performing the steps S110–S118 through step S122, the old recognition resultant vocabularies Dc11, Dc12, etc., in the genre file FJ are corrected (substituted) by new recognition resultant vocabularies Dc11, Dc12, etc.

Here, when the command operation corresponding to the control words WW of the first or second basic form is repeated at step S120, all the plural controlled object words X (or recognition resultant vocabularies Dc) which have been the subjects of the correction instructions are excluded from the genre dictionary MJ, and a similarity determination is conducted based on the remaining recognition reference vocabularies Db contained in the genre dictionary MJ. That is, every time a command operation of correction is performed, the recognition reference vocabularies to be excluded are expanded, and the range of recognition reference vocabularies Db to be compared is further narrowed down. Accordingly, the comparison range is made small and a speedy correction processing becomes possible.

Further, if at step S120, a command operation of "train station name, next candidate," which corresponds to control words WW (the first basic form control words) of "~, next candidate" shown in FIG. 5, for example, the next recognition resultant vocabulary Dc12 stored in the genre file FJ is presented at step S118. For example, if the recognition resultant vocabulary Dc12 is "hospital name," "It is hospital name, isn't it?" is presented to the user.

That is, different from the cases of the command operations of "train station name correction" and "correction," actual correction processing is not conducted through the steps S122 and steps S110–S116, and the recognition resultant vocabulary Dc12 is presented as the highest similarity recognition resultant vocabulary at step S118.

If the user again performs a command operation of "~, next candidate" in response to that presentation, the recognition resultant vocabulary Dc13, which is the next candidate in the genre file FJ, is presented. If a command operation for requesting the still next candidate is performed, the recognition resultant vocabulary Dc14, which is the next candidate in the genre file FJ, is presented. Thus, the user can instruct the command operation of requesting the next candidate up to the number of times corresponding to the number of the recognition resultant vocabularies Dc existing in the genre file FJ.

By performing such a next candidate command operation, the user need not actually voice-input vocabularies of genre. Further, this facilitates and speeds up correction processing in the speech recognition device.

Also, if at step S120, a command operation corresponding to control words WW of "next candidate" (the second basic form control words), correction processes similar to the case of "~, next candidate" are conducted. That is, if the user pronounces simply "next candidate," the recognition resultant vocabulary Dc12, which is the next candidate, stored in the genre file FJ becomes the controlled object word, and this recognition resultant vocabulary Dc12 is presented. If the next candidate command operation is performed again, the still next candidate of the recognition resultant vocabulary Dc13 becomes the controlled object word, and this recognition resultant vocabulary Dc13 is presented. Thus, the user can instructs the command operation of requesting the next candidate up to times corresponding to the number of the recognition resultant vocabularies Dc existing in the genre file FJ.

According to this command operation pronouncing only "next candidate", the user need not pronounce the vocabulary corresponding to the controlled object word X. Thus, a more speedy correction is possible as compared with the command operation of "~, next correction."

Also, the user can determine which command operation to be used. Thus, this speech recognition device has a high flexibility.

As explained above, by the command operations of "~, correction", "correction", "~, next candidate", and "next candidate", the user can easily perform corrections to finalize a desired genre. Of course, it is needless to say that these command operations may be conducted in a mixed manner, etc.

Next, when the user determines that the vocabulary of genre is confirmed in response to the recognition result presented at step S118, the flow moves from step S120 to the process of step S124.

At step S124, whether or not conditions for narrowing down to identify the institution name based on the stored recognition resultant vocabularies are met is determined by investigating the files FJ and FK. If the narrowing-down conditions are not yet satisfactorily met, the flow moves to step S126 to designate a region name dictionary MK, and processes starting from step S110 are repeated.

For example, if narrowing down cannot be achieved even with the recognition resultant vocabularies Dc11, Dc12, etc., already stored in the genre file FJ because the region name file FK still has not received the corresponding recognition resultant vocabulary, step S124 determines that the narrowing-down conditions have net yet been met. Then, at step S126, the region name dictionary MK is designated and the flow moves to the process of step S110.

In repeating processes from step S110, a synthesized sound of "Please enter a prefecture name", for example, is outputted at step S100 in order to request the user to pronounce a vocabulary belonging to the category of region name.

When the user voice-inputs a region name, such as "Tokyo", etc., in response (step S112), one or more of recognition resultant vocabularies Dc21, Dc22, etc., which have high similarities, are stored in the region name file FK through the process at steps S114 to S118.

Then, at step S118, a synthesized sound of "It is a train station name in Tokyo, isn't it?" is presented based upon the recognition resultant vocabularies stored in the genre file FJ and the region name file FK.

If the user performs a command operation by the voice of "Tokyo, correction" in response (S120), the recognition resultant vocabulary in the region name file FK is being corrected based upon the control words WW of "~, correction" in a manner similar to above.

Here, the correction process with respect to the region name is conducted in a manner similar to the correction process for the genre described above. Thus, the detailed explanation is omitted here. If the user pronounces simply "correction" at step S120, the process for correcting the recognition resultant vocabulary Dc21, which is the latest recognition result, is performed.

Further, if the user pronounces "Tokyo, next candidate", the recognition resultant vocabulary Dc22, which is the next candidate in the region name file FK, is presented. And every time the command operation of "~, next candidate" is performed, the still next candidate is presented further. This way, when the command operation of "~, next candidate" is performed, the user need not pronounce the vocabulary for correction, thereby enabling simple correction.

Also, if the user pronounces simply "next candidate", the correction process is being conducted by presenting the next candidate recognition resultant vocabulary. Accordingly, with the command operation of "next candidate", the user need not pronounce the vocabulary for the correction, thereby enabling simple correction.

However, if a command operation, which instructs correction of the recognition resultant vocabulary in the genre file FJ, is performed after the recognition resultant vocabularies Dc relating to the genre and the region name are stored in the genre file FJ and the region name file FK, respectively, the following correction process is performed.

First, in response to the command operation of either "~, correction" or "~, next candidate", the recognition resultant vocabularies Dc11, Dc12, etc., in the genre file FJ are corrected. Next, recognition reference vocabularies Db within the region name dictionary MJ which is under the recognition resultant vocabulary Dc11 (recognition resultant vocabulary after the correction), which have the highest similarity within the genre file FJ, are selected and set. Then, by comparing the stored analyzed data Da' of the region name, which has been stored in the analyzed data memory part 10 in advance, with the recognition reference vocabularies Db which have been selected and set, new recognition resultant vocabularies Dc are obtained and stored in the region name file FK.

Accordingly, when a command operation is performed to correct the genre which is a higher level concept than the region name, the speech recognition with respect to the region name is automatically conducted by utilizing the stored analyzed data Da', which have been already stored. Thus, the user can correct the recognition resultant vocabularies Dc21, Dc22, etc., in the region name file FK without pronouncing the region name again.

Here, even in this case of automatically correcting the recognition resultant vocabularies in the region name file FK, there is a possibility that errors may occur in the recognition, etc. However, the speech recognition is repeated based upon the stored analyzed data Da', which have been obtained when the user pronounced a vocabulary belonging to the category of region name. Thus, the user-desired region name can be speech-recognized at a high probability.

As a result, by efficiently utilizing the stored analyzed data Da', which have been voice-inputted, it is possible to realize a high speed correction processing as well as provide users with improved operability.

Figure 9:
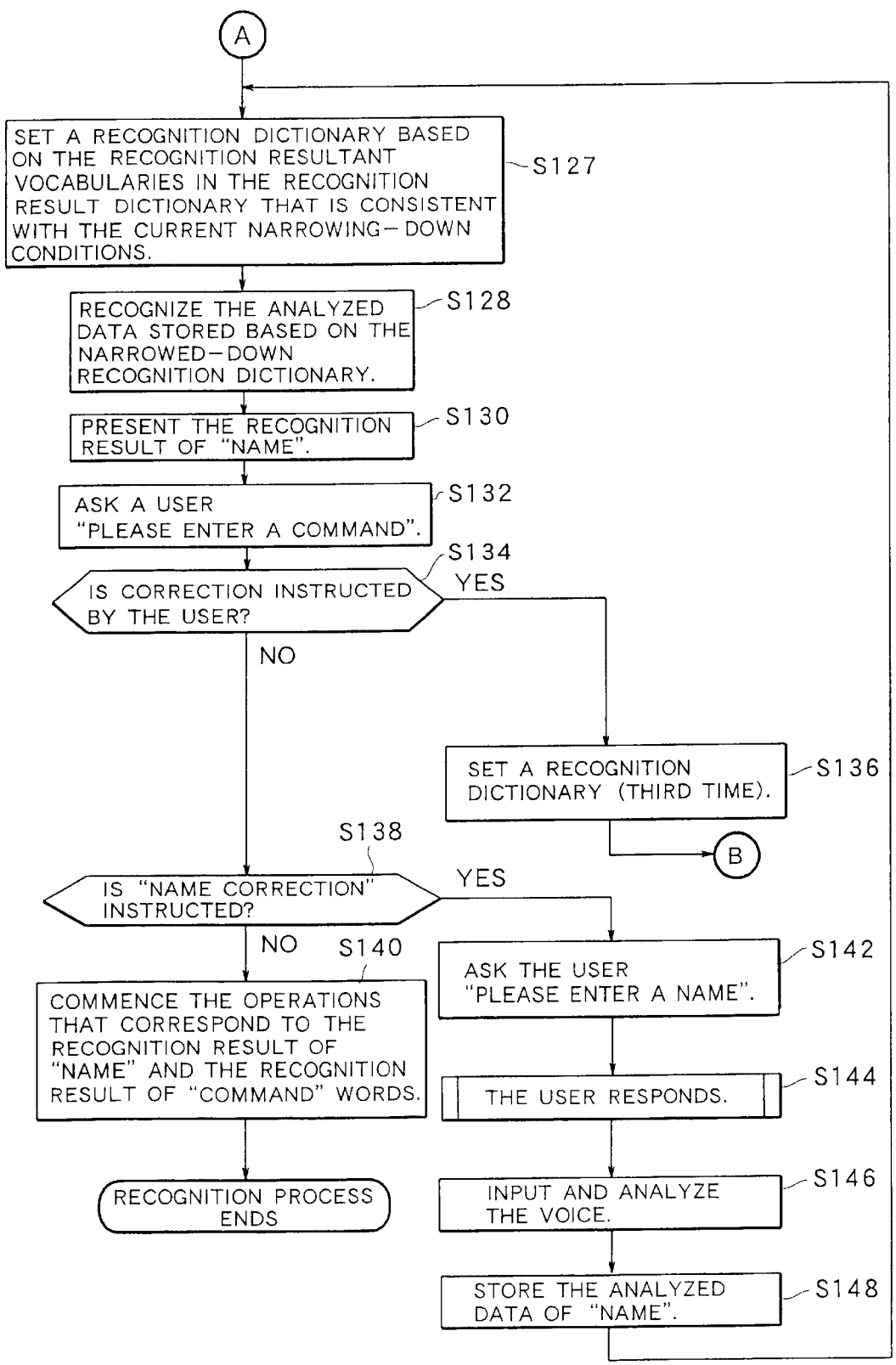
FIG. 9 is a flowchart for further explaining an example of a more specific operation of the present speech recognition device.

When the recognition resultant vocabularies Dc, which meet the narrowing-down conditions, are prepared in the recognition result memory region MR in this way, the determination at step S124 becomes "YES", and the flow moves to the process of step S127 shown in FIG. 9.

Step S127 determines the institution name dictionary ML which corresponds to the recognition resultant vocabularies Dc, which meet the narrowing-down conditions and are stored in the genre file FJ and the region name file FK shown in FIG. 3. For example, when the recognition resultant vocabularies Dc11 and Dc21, which meet the narrowing-down conditions, are "train station name" and "Tokyo", respectively, possible dictionaries for the institution name are narrowed down to the institution name dictionary ML of "List of Train Station Names" which is under the "Train Station Names in Tokyo", as shown in FIG. 2. Also, when the command operation of "~, next candidate" is performed, narrowing down operation is performed based upon the recognition resultant vocabularies determined by the corresponding next candidate.

Next, at step S128, the stored analyzed data Da' of the institution name ("Meguro Station", for example), which have been already stored in the analyzed data memory part 10, are introduced to the similarity calculation part 9, and the similarities between the stored analyzed data Da' and the recognition reference vocabularies Db in the institution name dictionary ML of "List of Train Station Names" are determined. Then, the recognition resultant vocabularies Dc having high similarities are memorized (stored) in the institution name file FL.

Next, at step S130, the highest similarity recognition resultant vocabulary within the institution name file FL (Dc31 in FIG. 3) is outputted through the voice output part 6 and/or displayed at display part 7. For example, if the recognition resultant vocabulary Dc31 turns out to be "Meguro station", the final determination result is presented by a synthesized voice of "It is Meguro station, isn't it?" or the like.

Then, the flow moves to the process at step S132 and after, which is a confirmation routine requesting the user to confirm the final determination result.

First, at step S132, a synthesized voice of "Please enter a command" is outputted in order to inquire the user whether the final recognition result should be further corrected.

If the user, in response, determines that correction of the genre or region name is necessary, and performs the command operation of either "~, correction" or "~, next candidate", the analyzed data Da corresponding to the inputted voice is recognized. Then, step S134 determines that the command operation for correction has been performed ("YES") based upon the control words WW, and the flow moves to step S136. Here, if an instruction, such as "correction", etc., is entered through the operation part 5 instead of voice input, the flow moves to step S136 in a similar manner.

Figure 8:
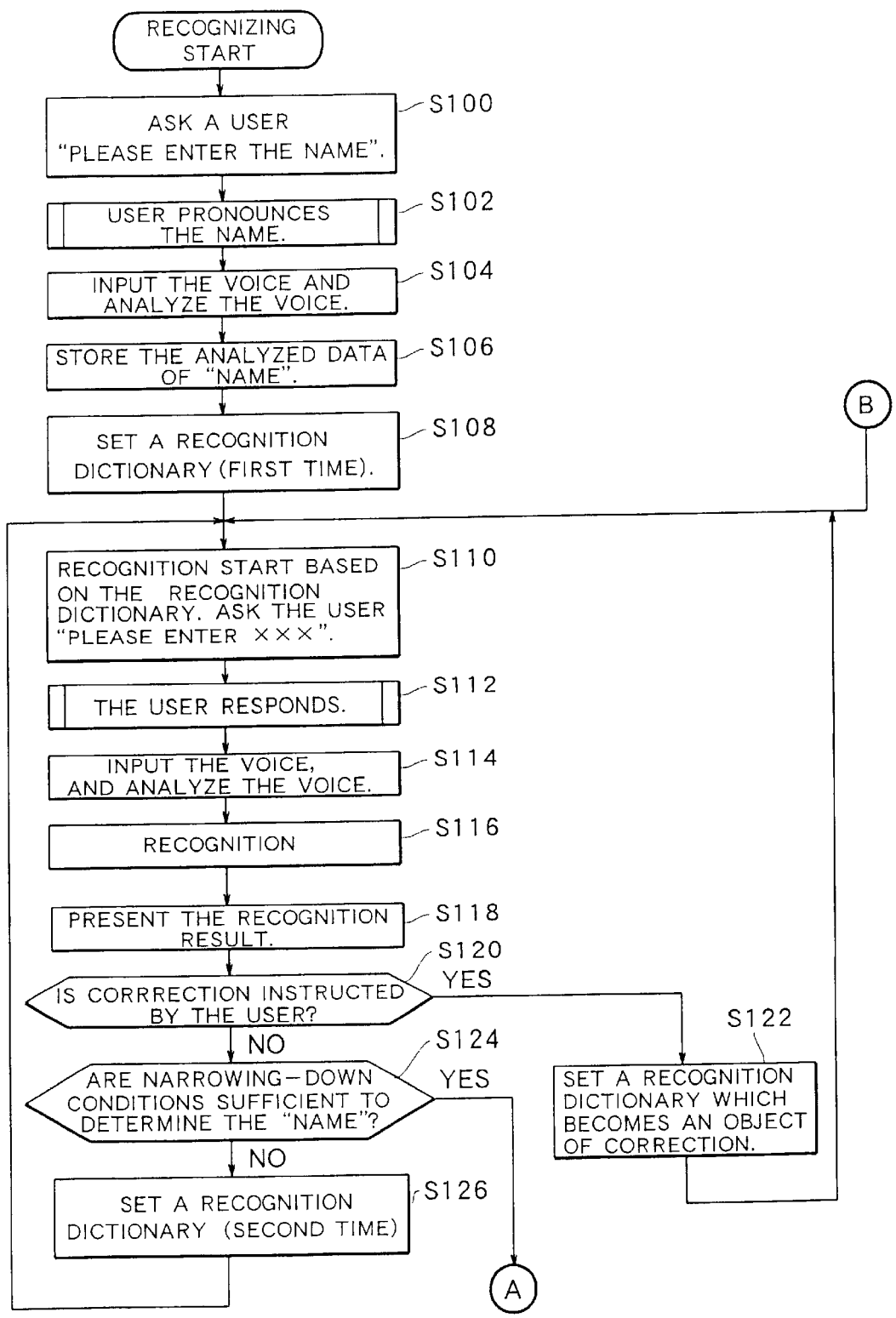
FIG. 8 is a flowchart for explaining an example of a more specific operation of the present speech recognition device.

At step S136, a recognition dictionary in the recognition word memory part 11 corresponding to the correction command is selected and set in a manner similar to the process of step S122 (see FIG. 8). Here, the recognition reference vocabulary which is instructed to be corrected is excluded in the selected recognition dictionary. Then, the process at step S110 and after, as shown in FIG. 8, are repeated to correct the recognition resultant vocabularies in the genre file FJ or the region name file FK to new recognition resultant vocabularies.

Because the correction processing at the step S110 and after has been explained above, the explanation thereof is omitted here.

If the command operation for correcting the genre or region name is not performed at step S134, and a command operation for correcting "institution name" is performed, step S138 determines that the command operation for correcting "institution name" is performed ("YES") based upon the corresponding control words WW, and the flow moves to step S142.

On the other hand, if none of the command operations for the genre, region name, and the institution name is performed, and a command operation other than correction commands, "Route search", for example, is performed, step S138 determines that there is no correction (determines "NO"), and the flow moves to step S140.

Once the flow moves to step S140, the operation instructed by the command operation is commenced. When the command operation of "Route search" is performed, as in the case of the example above, based upon the control words WW corresponding to that "command", the thus confirmed recognition resultant vocabulary Dc in the file FL is extracted; a driving path to the destination corresponding to the institution name of the recognition resultant vocabulary Dc is searched; and the searched driving path is displayed on a map through the display part 7. Then, the speech recognition processing is terminated, and the system awaits instruction for initiating another speech recognition.

On the other hand, if a correction command operation of "institution name", i.e., correction" or "correction", is performed at step S138, the flow moves to step S142, and a synthesized sound of "Please enter an institution name" is voice-outputted to request the user to pronounce a new vocabulary belonging to the category of institution name.

When the user pronounces a new institution name in response (step S144), the corresponding analyzed data Da are generated (step S146), and the analyzed data Da are stored in the analyzed data memory part 10 (step S148). Then, the flow returns to the process of step S127.

At step S127, narrowing-down is performed based upon the recognition resultant vocabularies which have been confirmed and stored in the genre file FJ and in the region name file FK to set an institution name dictionary ML in the recognition word memory part 11. Here, the recognition reference vocabulary which is instructed to be corrected is excluded in setting the dictionary.

Then, at step S128, the analyzed data Da' of the institution name, which have been stored in the analyzed data memory part 10, are compared with recognition reference vocabularies Db in the institution name dictionary ML to determine the similarities, and the recognition resultant vocabularies Dc having high similarities are stored in the institution name file FL.

This way, when the command operation for correcting "institution name" is performed, the institution name dictionary ML is selected and set based upon the recognition resultant vocabularies Dc which have already been stored in the genre file FJ and in the region name file FK, i.e., based on the recognition resultant vocabularies Dc, which satisfy the narrowing-down conditions. Accordingly, a speedy correction operation is possible as compared with resetting (correcting or changing) the genre and the region name from scratch. As a result, the user is not forced to perform cumbersome operations, thereby improving the operability.

In the convention art, a genre name and a region name, which are higher level concepts, need to be re-inputted if "institution name" is to be corrected. To the contrary, the present invention provides a greatly improved operability. Also, in the present invention, correction processing is performed in such a way as to conduct proper narrowing-down processing, thereby improving the speech recognition rate.

Furthermore, when the user performs a command operation of "next candidate" or "~, next candidate" for correcting the institution name, whether or not there exists the next candidate of the recognition resultant vocabulary in the institution name file FL is determined at steps S142 to S148. If the next candidate exits, the process of step S127 is performed using the next candidate recognition resultant vocabulary as the recognition result. Accordingly, the correction processing is performed so that proper narrowing-down processing is properly performed without voice-inputting again a genre and an institution name, which are the higher level concepts. Also, the user is not forced to perform cumbersome operations, thereby improving the operability.

As explained above, according to the present preferred embodiment, it is possible to perform speech recognition in conformity with the characteristics of user's thought characteristics and to provide simple and speedy correction operations (correction command operation) without forcing the user to perform cumbersome operations.

Figure 10:
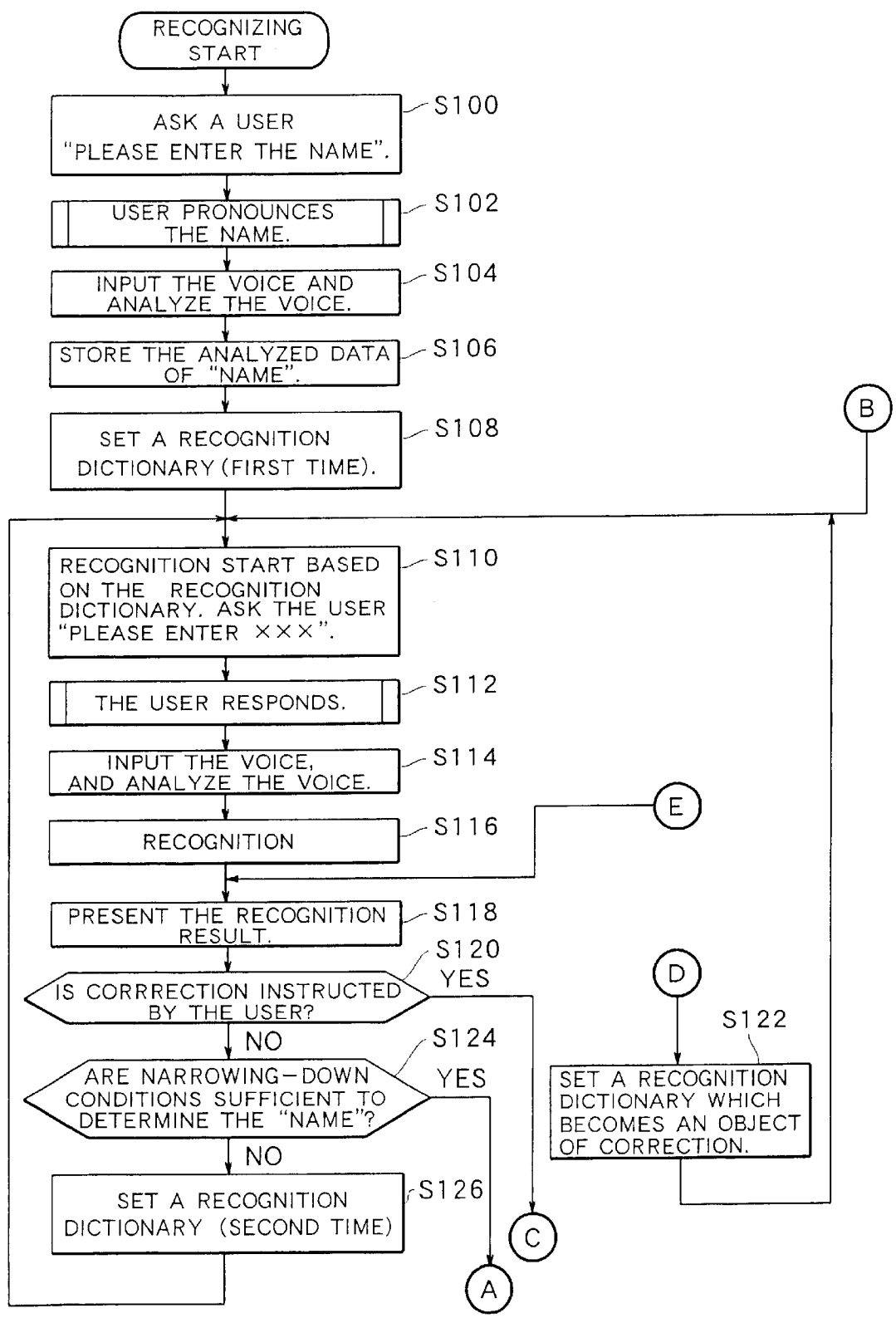
FIG. 10 is a flowchart for further explaining an example of a more specific operation of the present speech recognition device.
Figure 11:
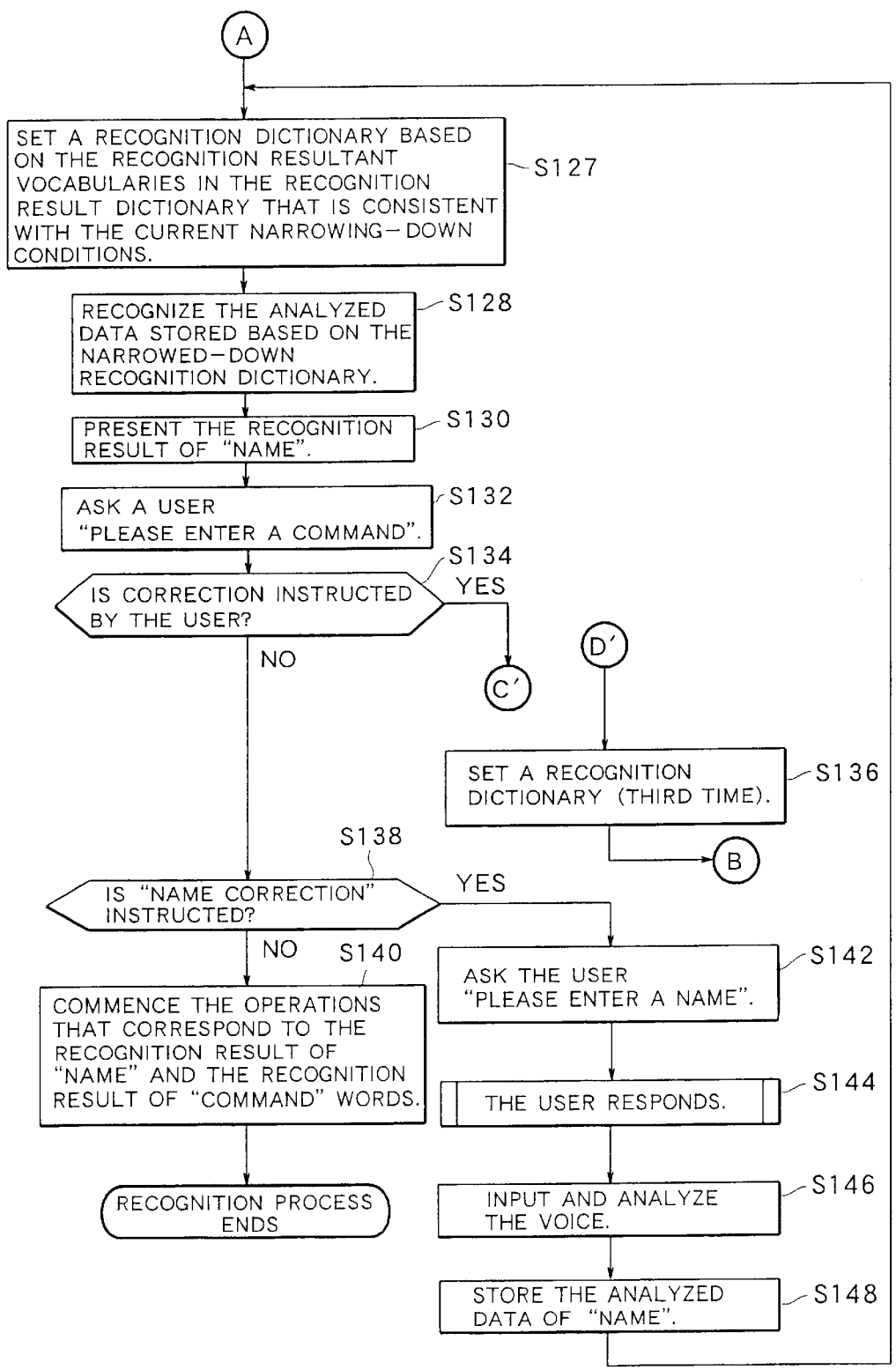
FIG. 11 is a flowchart for further explaining an example of a more specific operation of the present speech recognition device.
Figure 12:
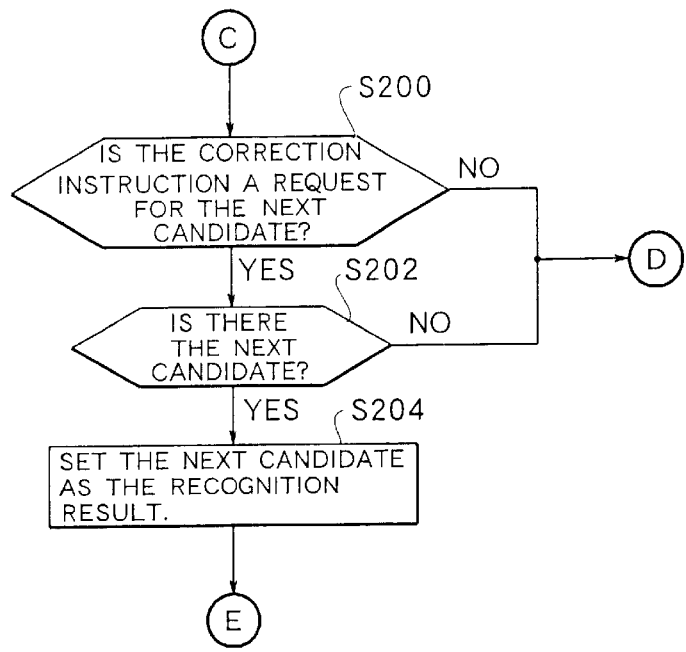
FIGS. 12A and 12B are flowcharts for further explaining an example of a more specific operation of the present speech recognition device.
Figure 12:
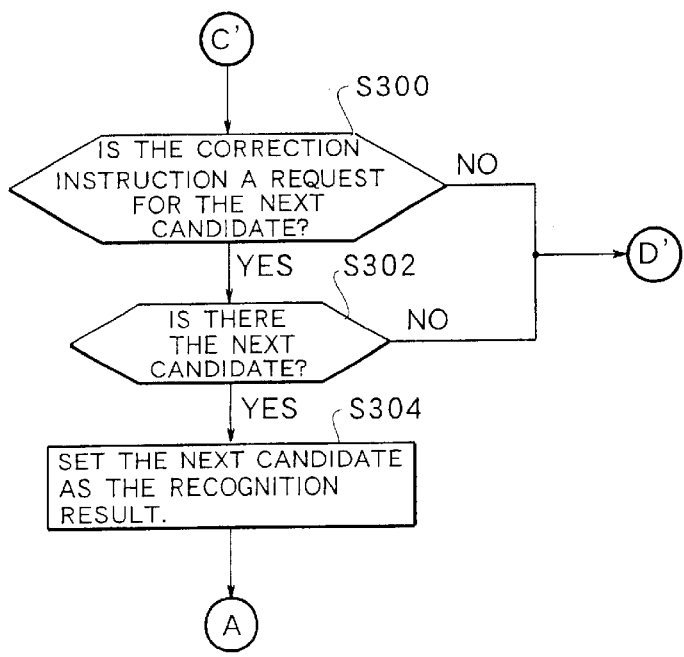

Next, with reference to flowcharts of FIGS. 10 to 12, a more concrete example of operation of correction processing when a command operation of "next candidate" or "~, next candidate" is performed is explained.

In FIGS. 10 and 12, the processes corresponding to those in FIGS. 8 and 9 are referred by the same step numbers.

Here, however, more details are given for the process in which S120 determines that the user requested correction (determines "YES), and then the process of step S122 or S118 in FIG. 10 is initiated through node D or E after the processes in FIG. 12A are performed. Further, more details are given for the process in which step S134 determines that the user requested correction (determines "YES"), and then the process of step S136 or S127 is initiated through node D' or A after the processes of FIG. 12B are performed.

That is, determination of the next candidate of the recognition resultant vocabulary in correspondence with the command operation of "next candidate" or "~, next candidate" is performed at step S204 and step S304 in FIG. 12A and 12B, respectively.

First, when the command operation for correction is performed at step S120 of FIG. 10, the flow moves to step S200 shown in FIG. 12A.

At step S200, determination is made whether the simple command operation of pronouncing "next candidate" or the command operation of "~, next candidate" was performed. When either one of these command operations for requesting the next candidate is performed, step S202 determines whether there exists the next candidate of the recognition resultant vocabulary within the designated file (file designated from FJ, FK, and FL) based upon control words WW.

If the next candidate of the recognition resultant vocabulary exists, step S204 determines the next candidate as the recognition result. Then, the flow moves to step S118 of FIG. 10 through node E, and the recognition resultant vocabulary is presented as the recognition result.

Accordingly, when the command operation of "next candidate" or "~, next candidate" is performed, the process of step S118 is directly performed through node e.g, without performing the processes of steps S110 to S116, thereby realizing simplification of the process.

On the other hand, if either step S200 or S202 in FIG. 12A returns "NO", the process moves to step S122 through node D. This enables the user to perform a command operation other than "next candidate" or "~, next candidate"; e.g., a command operation of "correction" or "~, correction", which instructs a correction to be made.

Similarly, when the command operation for correction is performed at step S134 of FIG. 11, the flow moves to step

300 of FIG. 12B. At step S300, determination is made whether the simple command operation of pronouncing "next candidate" or the command operation of "~, next candidate" was performed. When either one of these command operations for requesting the next candidate is performed, step S302 determines whether there exists the next candidate of the recognition resultant vocabulary within the designated file (file designated from FJ, FK, and FL) based upon control words WW.

If the next candidate of the recognition resultant vocabulary exists, step S304 determines the next candidate as the recognition result. Then, the flow moves to step S127 of FIG. 11 through node A, and-the recognition resultant vocabulary is presented as the recognition result.

Accordingly, when the command operation of "next candidate" or "~, next candidate" is performed, the process of step S127 is directly performed through node A, thereby realizing simplification of the process.

On the other hand, if either step S300 or S302 in FIG. 12B returns "NO", the process moves to step S136 of FIG. 11 through node D'. This enables the user to perform a command operation other than "next candidate" or "~, next candidate"; e.g., a command operation of "correction" or "~, correction", which instructs a correction to be made.

Next, if at step S138 in FIG. 11, it is determined that a command operation of "next candidate" or "~, next candidate" for correcting the institution name was performed (determination of "YES"), the processes of steps S142 to S148 are conducted, and the processes of S127 and after are repeated. However, if the instruction to correct the institution name is given by the command operation of "next candidate" or "~, next candidate", the processes of FIG. 12B are performed at the processes of steps S142 to S148, and the processes of step S127 and after are repeated.

In this way, when the command operation of "next candidate" or "~, next candidate" is performed, the next candidate for the recognition resultant vocabulary is determined by performing the processes of FIG. 12A or 12B.

As explained above, the present preferred embodiment possesses an excellent functionality in that users can provide greatly simplified and speedy correction instructions through the command operation of "next candidate" and "~, next candidate". A plurality of recognition resultant vocabularies Dc stored in the recognition result memory region MR are such recognition resultant vocabularies which are identical or similar to vocabularies which belong to the categories of institution name, genre, and region name. Thus, even if the recognition resultant vocabulary which has the highest similarity turns out to be recognized in error, there is a high possibility that the recognition resultant vocabulary which is identical to the vocabulary pronounced by the user exits in the remaining (subsequent candidates) recognition resultant vocabularies. Because of this, the user's command operation of "next candidate" or "~, next candidate" for instructing the correction enables high-probability determination of the desired recognition resultant vocabulary with simple correction operations.

Here, the preferred embodiment above explains the cases where the present speech recognition device requests the user to pronounce a vocabulary, and the user voice-inputs a vocabulary one by one in response thereto, as a typical example. However, the present invention is not limited to this. In particular, the speech recognition device may request the user to pronounce a plurality of vocabularies, and the user may voice-input a plurality of vocabularies in the form of a, continuous speech.

That is, when the speech recognition device requests a plurality of vocabularies, it sets the recognition dictionaries which correspond to the attributes (categories) of these vocabularies among the recognition dictionaries in the recognition word memory part 11. Then, by comparing the recognition reference vocabularies Db in the selected recognition dictionaries with the plurality of analyzed data Da and by receiving instructions and commands from the user through control words WW, the plurality of vocabularies can be received at once based on the control words WW.

That is, because, as shown in FIGS. 4C to 4E, control words WW can be realized by connecting a plurality of basic forms, when a plurality of vocabularies is voice-inputted, these plural vocabularies can be united to a set of control words WW. Thus, the processes instructed by the user may be collectively processed or divisionally processed based on the control words. WW. This way, because control words WW are utilized to receive the voice input from users, it becomes possible to provide highly flexible processing.

Furthermore, the vocabularies of the control command word Y, as explained above, are merely exemplary. Other vocabularies are also possible. For example, vocabularies, such as "wrong", "correct", etc., may be used instead of "correction", and vocabularies, such as "next", "candidate", "candidate change", etc., may be used instead of "next candidate".

As explained above, according to the present invention, control words corresponding to respective processing functions are pre-stored; and when the one processing function is presented, and voice input information having instruction information which designates the one processing function is inputted from outside in response to the presentation, the voice input information is recognized, and the processing function is performed in accordance with the control words corresponding to the instruction information. Accordingly, by setting the control words to have various processing functions in advance, it becomes possible to perform various processes promptly and accurately. As a result, superior effects are obtained in conducting the conversational operations.

While there has been described what are at present considered to be preferred embodiments of the present invention, it will be understood that various modifications may be made thereto, and it is intended that the appended claims cover all such modifications as-fall within the true spirit and scope of the invention.

What is claimed is:

1. A speech recognition apparatus comprising:
    circuits for receiving an input word inputted according to a request from the voice recognition apparatus;
    a comparator for comparing the input word with reference vocabularies related to the request, and for selecting at least one of the reference vocabularies;
    a first memory for storing the selected at least one of the reference vocabularies;
    a controller for executing a control word having a structure composed by a control command word and an object word controlled by the control command word;
    wherein, if the input word includes the control command word only, the controller substitutes the selected at least one of the reference vocabularies already stored in the first memory for the object word and creates the control word.

2. The speech recognition apparatus according to claim 1, wherein the first memory stores a plurality of selected reference vocabularies, the controller selects a candidate from the plurality of selected reference vocabularies, and the control command word includes a command to change the candidate to another one of the plurality of selected reference vocabularies stored in the first memory.

3. The speech recognition apparatus according to claim 1, wherein if the control word is inputted into the voice recognition apparatus in a lump, the controller executes the control word.

4. The speech recognition apparatus according to claim 1, wherein the control command word includes a command to correct the object word.

5. The speech recognition apparatus according to claim 3, wherein the first memory stores a plurality of selected reference vocabularies, the controller selects a candidate from the plurality of selected reference vocabularies, and the control command word includes a command to change the candidate to another one of the plurality of selected reference vocabularies stored in the first memory.

6. The speech recognition apparatus according to claim 3, wherein the control command word includes a command to correct the object word.

7. The speech recognition apparatus according to claim 4, wherein the comparator comprises:
   an analyzer for analyzing the input word;
   a second memory for storing an analyzed result of the analyzer; and
   circuits for evaluating a similarity between the analyzed results and the reference vocabularies related to the request.

8. The speech recognition apparatus according to claim 6, wherein the comparator comprises:
   an analyzer for analyzing the input word;
   a second memory for storing an analyzed result of the analyzer; and
   circuits for evaluating a similarity between the analyzed results and the reference vocabularies related to the request.

9. A speech recognition apparatus comprising:
   circuits for receiving an input word inputted according to a request from the voice recognition apparatus;
   a comparator for comparing the input word with a plurality of reference vocabularies related to the request, and for selecting selected reference-vocabularies from said plurality of reference vocabularies, based on a similarity with the input word;
   a first memory for storing the selected reference vocabularies;
   a controller for selecting a candidate from the selected reference vocabularies and executing a control word having a structure composed by a control command word and an object word controlled by the control command word;
   wherein the control word includes a control command word to change the candidate to another one of said selected reference vocabularies, so that a desired candidate is obtained by repeating the control command word without the object word.

10. The speech recognition apparatus according to claim 9, wherein the controller substitutes a selected reference vocabulary from the selected reference vocabularies already stored in the first memory for the object word.

11. The speech recognition apparatus according to claim 9, wherein the voice recognition apparatus is included in a navigation apparatus.

12. A speech recognition apparatus comprising:
   first circuits for receiving a first input word inputted according to a first request from the voice recognition apparatus, and for receiving a second input word inputted according to a second request from the voice recognition apparatus;
   an analyzer for analyzing the first input word and the second input word, and for generating a first analyzed result and a second analyzed result;
   a first memory for storing the first analyzed result and the second analyzed result;
   second circuits for evaluating a similarity between the first analyzed result and first reference vocabularies related to the first request, and for evaluating a similarity between the second analyzed result and second reference vocabularies related to the second request;
   a comparator for selecting first selected reference vocabularies from the first reference vocabularies related to the first request, and for selecting second selected reference vocabularies from the second reference vocabularies related to the second request;
   a controller for selecting a first candidate from the first selected reference vocabularies and a second candidate from the second selected reference vocabularies;
   wherein the first and second candidates are selected based on first and second similarity, respectively; and
   wherein when the controller changes the first candidate to a corrected first candidate, the second circuits evaluate a similarity between the second analyzed result and corrected second reference vocabularies belonging to the corrected first candidate, again after the first candidate is corrected, to select corrected second selected reference vocabularies, and selects a corrected second candidate from the corrected second selected reference vocabularies.

13. The speech recognition apparatus according to claim 12, wherein the first candidate is excluded from the first selected reference vocabularies in the case that the controller corrects the first candidate.

14. The speech recognition apparatus according to claim 12, wherein the voice recognition apparatus is included in a navigation apparatus.

15. The speech recognition apparatus according to claim 12, further comprising:
   a second memory for storing the first selected reference vocabularies having the similarity to the first analyzed result;
   wherein the controller corrects the first candidate by selecting another one of the first selected reference vocabularies stored in the second memory.

16. The speech recognition apparatus according to claim 12, further comprising:
   a second memory for storing the second selected reference vocabularies having the similarity to the second analyzed result;
   wherein the controller corrects the second candidate by selecting another one of the second selected reference vocabularies stored in the second memory.

17. The speech recognition apparatus according to claim 12, further comprising:
   a second memory for storing the corrected second selected reference vocabularies having the similarity to the second analyzed result;
   wherein the controller changes the corrected second candidate to another one of the corrected second selected reference vocabularies stored in the second memory.

18. The speech recognition apparatus according to claim 12, further comprising:

a third input word inputted according to a third request from the voice recognition apparatus;

wherein the voice recognition apparatus analyzes the third input word, generates a third analyzed result, evaluates a similarity between the third analyzed result and third selected reference vocabularies related to the third request, and selects one of the third selected reference vocabularies as the corrected first candidate.

19. The speech recognition apparatus according to claim 15, wherein the first candidate has the highest similarity to the first input word, and said another one of the first selected reference vocabularies has the next highest similarity to the first input word.

20. The voice recognition apparatus according to claim 16, wherein the second candidate has the highest similarity to the second input word, and the another one of the second selected reference vocabularies has the next highest similarity to the second input word.

21. The speech recognition apparatus according to claim 17, wherein the corrected second candidate has the highest similarity to the second input word, and said another one of the corrected second selected reference vocabularies has the next highest similarity to the second input word.

22. The speech recognition apparatus according to claim 18, further comprising:

a second memory for storing the third selected reference vocabularies having the similarity to the third analyzed result;

wherein the controller changes the corrected first candidate to another one of the third selected reference vocabularies stored in the second memory.

23. The speech recognition apparatus according to claim 22, wherein the corrected first candidate has the highest similarity to the third input word, and said another one of the third selected words has the next highest similarity to the third input word.

* * * * *